United States Patent [19]
May

[11] Patent Number: 5,842,307
[45] Date of Patent: Dec. 1, 1998

[54] SELF-ADJUSTING, AUTOMATIC SPOT WEED SPRAYER

[76] Inventor: Kenzel May, 2500 N. Big Springs St., #280, Midland, Tex. 79705-6673

[21] Appl. No.: 786,077

[22] Filed: Nov. 15, 1996

[51] Int. Cl.$^6$ .......................... A01C 15/00; A01G 13/00; A01D 75/28
[52] U.S. Cl. ........................................... 47/1.7; 56/10.2 E
[58] Field of Search .............................. 47/1.7; 56/10.2 E

[56] References Cited

U.S. PATENT DOCUMENTS

| 3,959,924 | 6/1976 | Allen, Jr. | 47/1.43 |
|---|---|---|---|
| 4,206,569 | 6/1980 | Randolph | 47/1.7 |
| 5,086,582 | 2/1992 | Hamilton | 47/1.7 |
| 5,144,767 | 9/1992 | McCloy et al. | 47/1.7 |
| 5,222,324 | 6/1993 | O'Neall et al. | 47/1.7 |
| 5,278,423 | 1/1994 | Wangler et al. | 47/1.7 |
| 5,279,068 | 1/1994 | Rees et al. | 47/1.7 |
| 5,315,564 | 5/1994 | Upton | 47/1.7 |
| 5,381,624 | 1/1995 | Davis et al. | 47/1.7 |
| 5,585,626 | 12/1996 | Beck et al. | 47/1.7 |
| 5,613,635 | 3/1997 | Harden et al. | 47/1.7 |

FOREIGN PATENT DOCUMENTS

| 2345898 | 10/1977 | France | 47/1.7 |
|---|---|---|---|
| 0214997 | 10/1984 | German Dem. Rep. | 47/1.7 |
| 2923355 | 12/1979 | Germany | 47/1.7 |
| 3426586 | 2/1986 | Germany | 47/1.7 |
| 405138091 | 6/1993 | Japan | 47/1.7 |
| WO8909540 | 10/1989 | WIPO | 47/1.7 |

Primary Examiner—Michael J. Carone
Assistant Examiner—Fredrick T. French, III
Attorney, Agent, or Firm—Henderson & Sturm

[57] ABSTRACT

An automatic spot weed sprayer which is self-adjusting in the vertical to compensate for changes in crop height as the device moves along a row of crop. In a preferred embodiment, the invention is secured to the tool bar of a tractor which also carries a series of cultivators for removing weeds between crop rows. A photoelectric sensor passes down each row, just above the crop, to detect weeds which typically grow faster and therefore higher than the crop itself. When the beam is broken by a weed, a signal is sent to a Programmable Logic Computer (PLC) which then triggers a spray nozzle to dispense herbicide by a time delay based on the speed of the tractor. Concurrently, two sets of vertically spaced photoelectric sensors continually monitor crop height and signal the PLC to raise and lower the spray bar to compensate for crop height changes as the sprayer travels about the field.

5 Claims, 8 Drawing Sheets

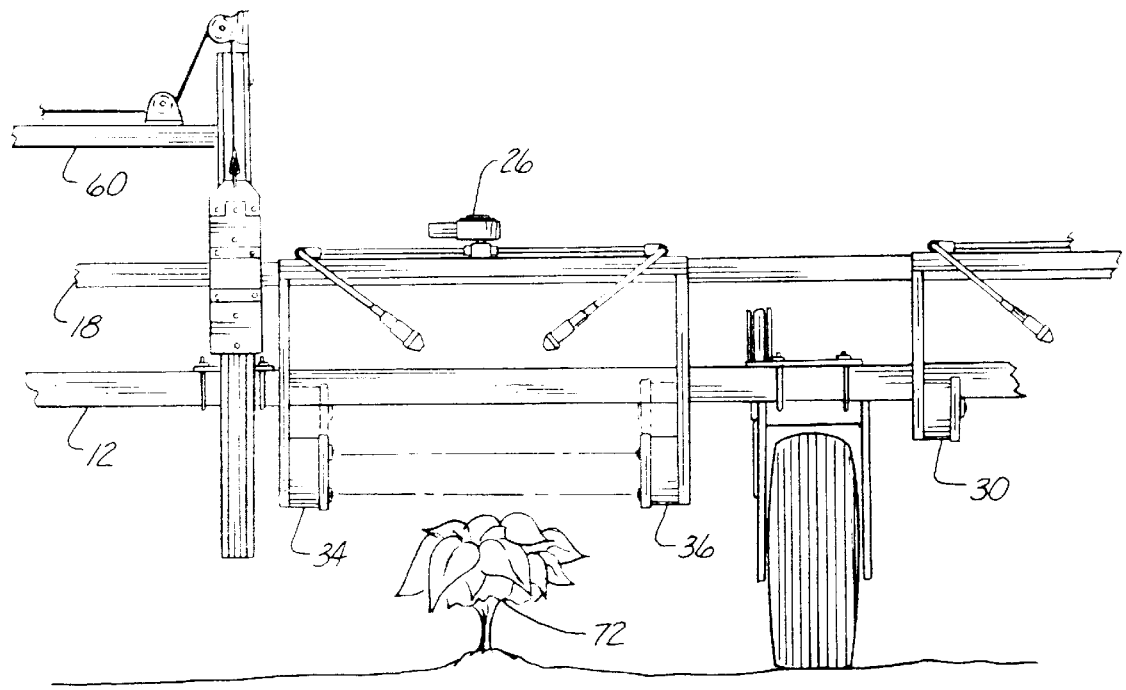
Fig. 7
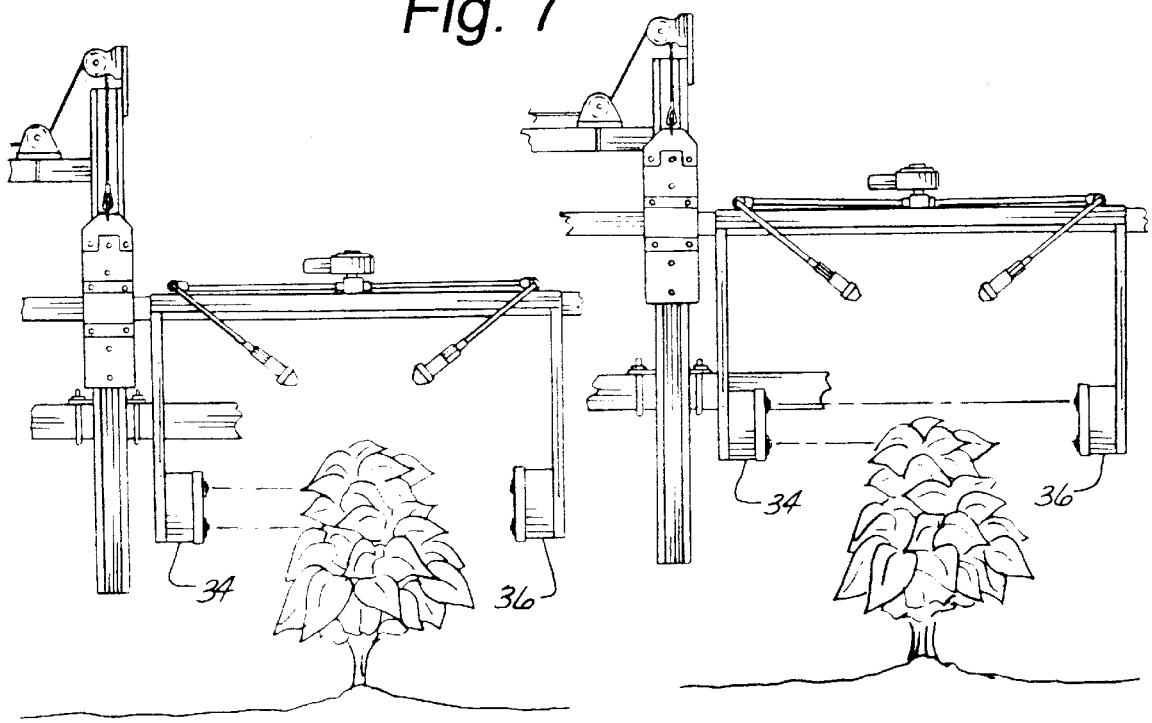
Fig. 8
Fig. 9

SELF-ADJUSTING, AUTOMATIC SPOT WEED SPRAYER

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to agricultural spraying equipment, and more particularly to a spraying system which selectively detects and sprays weeds within a row of crops.

2. Description of Related Art

It is certainly well known by those involved in agriculture that weeds grow among the desired crop. Those weeds which grow between the crop rows can be removed by cultivation. The weeds growing within a row of crop must either be removed by hand or by spraying with a herbicide. Spraying with herbicides is usually accomplished by spraying the entire crop, a method which wastes a great deal of expensive herbicide and is also environmentally undesirable.

Several prior art devices have been patented which attempt to selectively spray the weeds within the crop rows. U.S. Pat. No. 3,959,924, issued in 1976 to John Allen, Jr., utilizes a horizontal probe which is attached to the front of a tractor and moved down a crop row just above the crop. When the probe contacts weeds which are taller then the crop, an electric circuit triggers a valve which dispenses herbicide onto the weed. U.S. Pat. No. 5,222,324, issued in 1993 to Donald O'Neall, uses a photo detector in place of the probe of Allen to accomplish much the same result. U.S. Pat. No. 5,381,624, issued in 1995 to D. Darryll Davis and Marlin Anderson, Jr., uses a sensor very similar to the Allen probe to detect weeds which triggers a pair of timers and an opto-isolator to activate a particular herbicide spray nozzle.

These devices apparently accomplish their intended purpose, but their usefulness is somewhat limited in that the tractor driver must continually monitor crop height and adjust the vertical position of the sensors so they will not be activated by the crops themselves. If the sensors are set too low, the crops themselves activate the sensors and are sprayed. If the sensors are set too high, weeds go undetected and unsprayed.

BRIEF SUMMARY OF THE INVENTION

The present invention discloses an automatic spot weed sprayer which is self-adjusting in the vertical to compensate for changes in crop height as the device is moved along a row of crop. In a preferred embodiment, the invention is secured to the tool bar of a tractor which may also carry a series of cultivators for removing weeds between the rows of crops. A photoelectric sensor passes down each row, just above the crop, to detect weeds which typically grow faster and are therefore taller than the crop itself. When the beam is broken by a weed, a signal is sent to a Programmable Logic Controller (PLC) which then triggers a spray valve to dispense herbicide by a time delay based on the speed of the tractor and for a duration based on the width of the weed. Concurrently, two sets of vertically spaced photoelectric sensors continually monitor crop height and signal the PLC to raise and lower the spray bar to compensate for crop height changes as the sprayer is drawn down the rows of crops.

BRIEF DESCRIPTION OF THE SEVERAL VIEWS OF THE DRAWINGS

Other objects, advantages, and novel features of the present invention will become apparent from the following detailed description of the invention when considered in conjunction with the accompanying drawings, wherein:

FIG. 7 is a rear view of the invention with the spray bar and crop height sensor too high;

FIG. 8 is a rear view of the invention with the spray bar and crop height sensor too low;

FIG. 9 is a rear view of the invention with the spray bar and crop height sensor at the proper height;

DETAILED DESCRIPTION OF THE INVENTION

Figure 1:
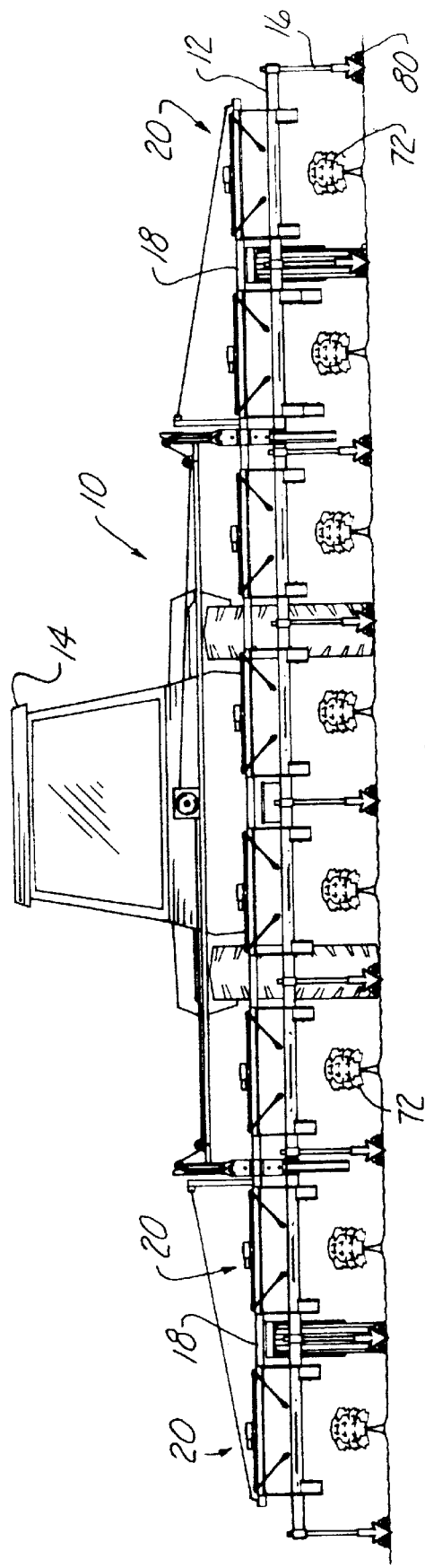
FIG. 1 is a rear view of an eight row embodiment of the invention attached to the toolbar of a tractor which is also cultivating a cotton crop.

Referring now to the drawings, wherein like reference numerals designate identical or corresponding parts throughout the several views, FIG. I shows the invention depicted generally at 10, secured to the toolbar 12 of a tractor 14. In this instance, there are also cultivators 16 attached to the toolbar 12 for digging up weeds 80 between rows of crops 72. This particular embodiment of the invention utilizes eight separate spray units 20 to treat eight rows of crops 72. The spray units 20 are each secured to a common spray bar 18.

Figure 3:
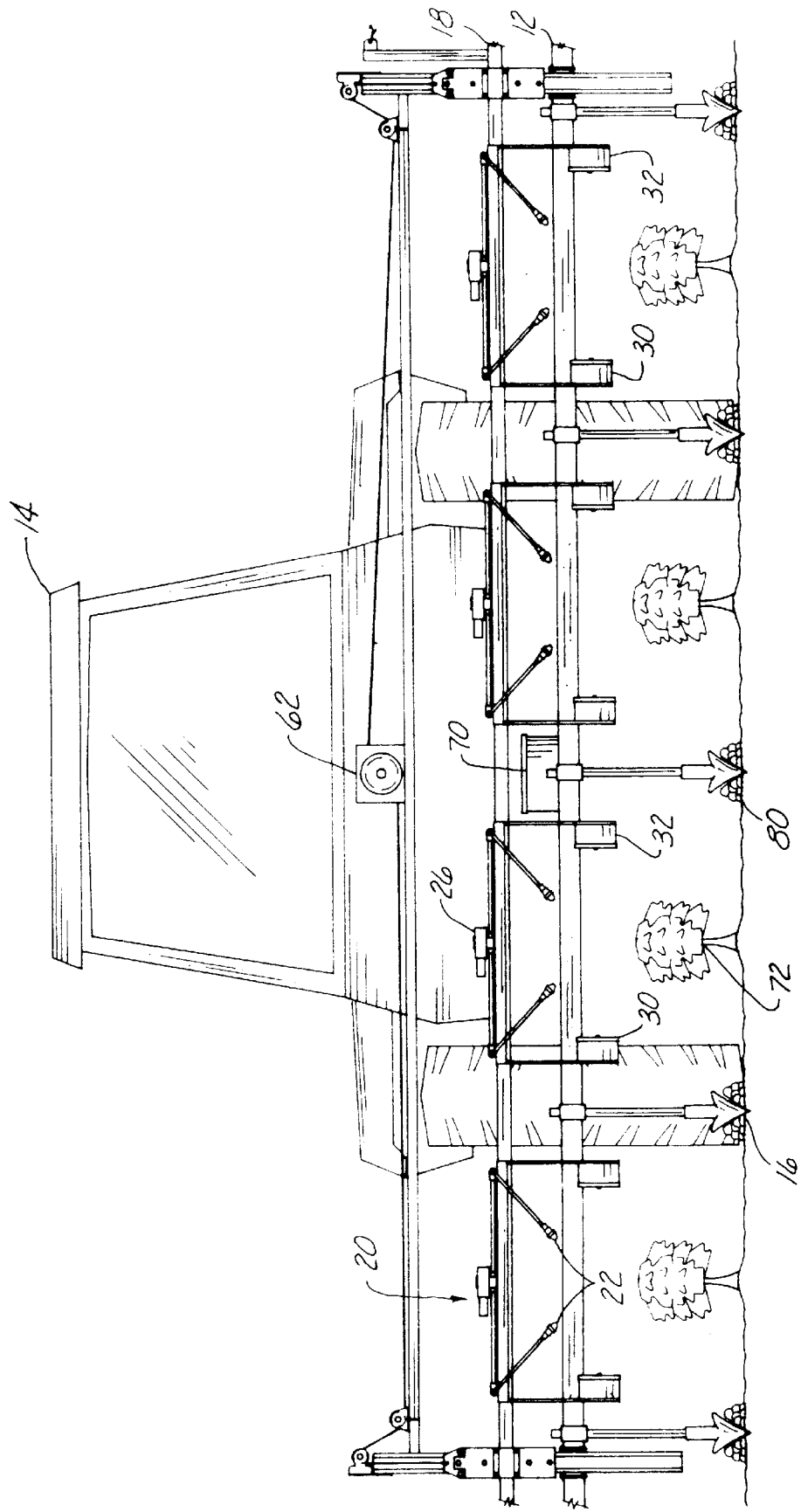
FIG. 3 is a close-up rear view of the invention as depicted in FIG. 1, showing the middle four spray units and the height adjustment mechanism.
Figure 4:
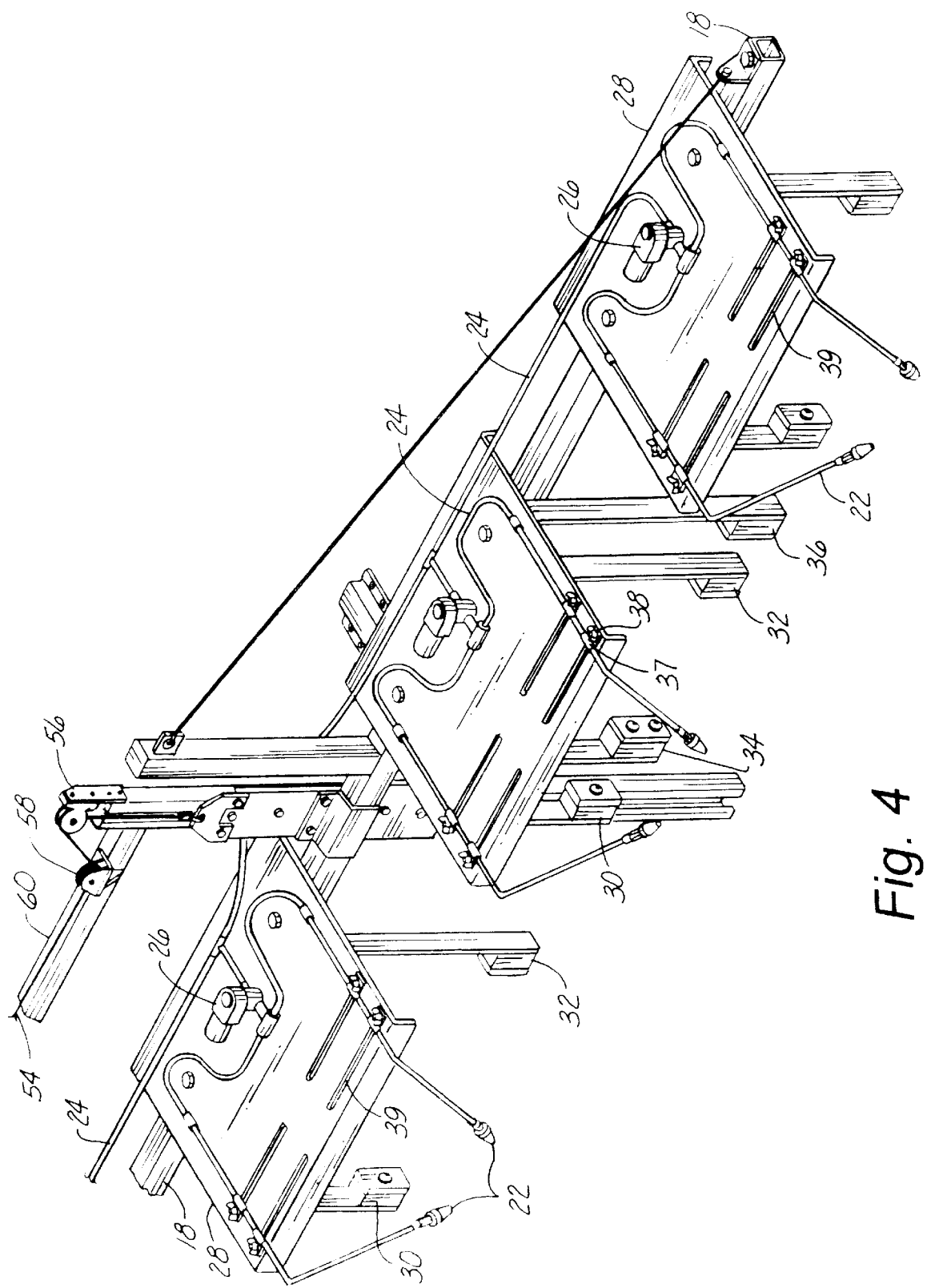
FIG. 4 is a perspective view of the right three spray units and one of the height adjustment mechanisms of the invention.

Referring now to FIGS. 3 and 4, each spray unit 20 is seen to comprise a pair of spray nozzles 22 connected by tubing 24 to an electrically controlled valve 26, which is in turn connected by tubing 24 to a herbicide storage tank (not shown). The nozzles 22, valves 26, and accompanying tubing 24 are conveniently secured to a plate 28 which is secured to the spray bar 18 and rides above the crops. The spray nozzles 22 are held in place on plates 28 by means of clamps 37 and wingnuts 38, allowing the nozzles 22 to be repositioned fore and aft, and also in width apart by means of slots 39. Each spray unit 20 also includes a weed sensor, comprised of a photoelectric transmitter 30 and receiver 32, which are attached to and extend below the plate 28 in a spaced apart fashion whereby they travel down opposite sides of the crop 72 as the tractor moves down the rows.

One of the spray units 20 also includes a crop height sensor which, like the weed sensors, is attached to and extend below the plate 28. The crop height sensor, however, extends approximately four inches lower than the weed sensor. The crop height sensor comprises a dual photoelectric transmitter 34 and a dual photoelectric receiver 36, with the transmitter-receiver pairs vertically spaced apart by three inches.

Figure 5:
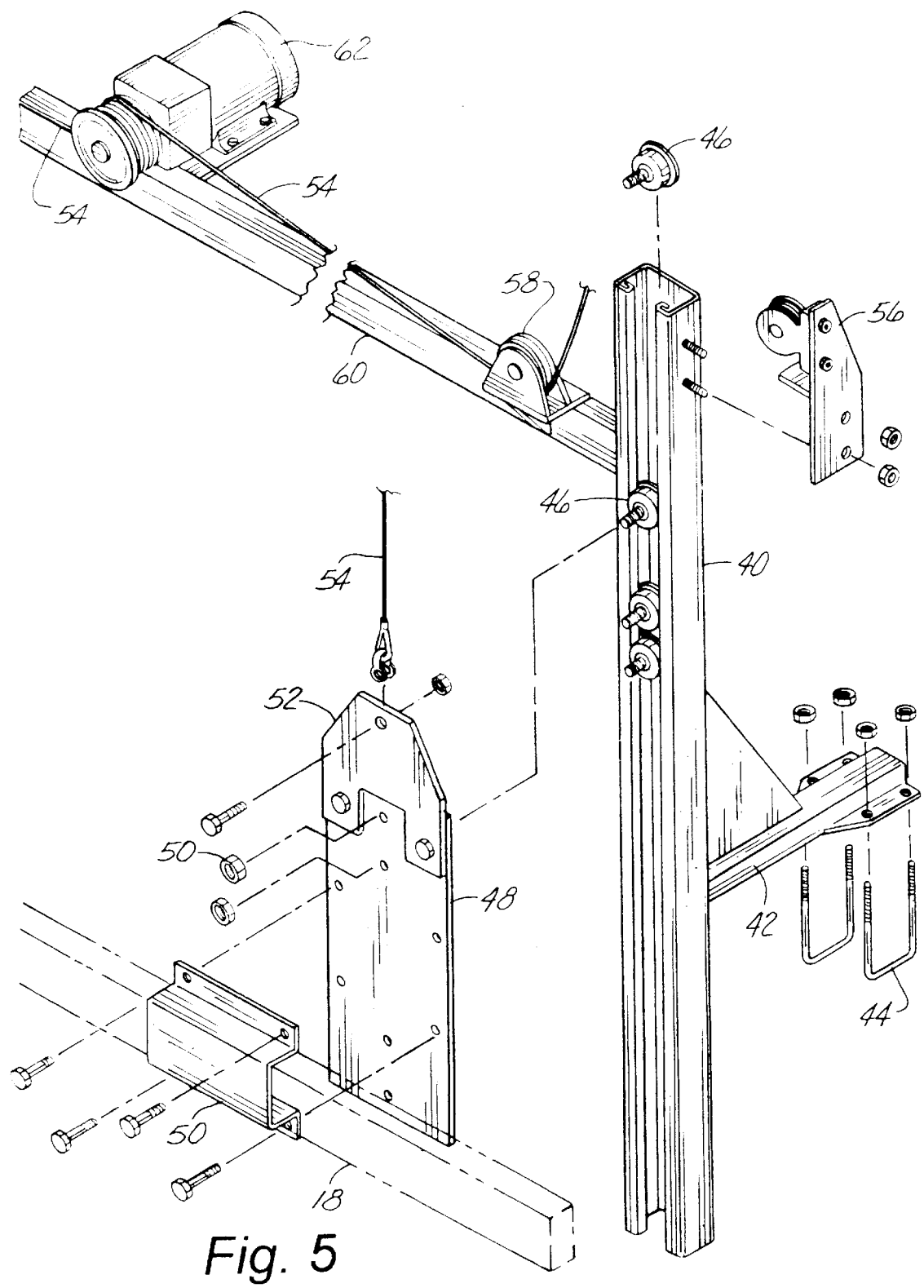
FIG. 5 is a perspective, exploded view of the height adjustment mechanism of the invention.

Referring now to FIGS. 3,4, and 5, the spray bar height adjustment mechanism is seen to comprise two vertical tracks 40 which are secured to a horizontal support beam 42 for attachment to the toolbar 12 by means of a pair of U-bolts 44. As clearly depicted in FIG. 5, the vertical tracks 40 are C-shaped channel members and can receive and carry rollers 46 for vertical travel within the channel. Four of the rollers 46 are secured to each of two slide plates 48 by nuts 50. The spray bar 18 is attached to the slide plates 48 by a U-shaped bracket 50. Attached to the upper end of each slide plate 48 is a bracket 52, which is in turn connected to a steel cable 54. The cable 54 is routed over an outer pulley assembly 56 which is secured to the upper end of each of the vertical tracks 40, and then under an inner pulley assembly 58 which is affixed to a crossbeam 60 extending between the two vertical tracks 40. The cable 54 then is attached to an electric winch 62 which is secured to the crossbeam 60.

Figure 2:
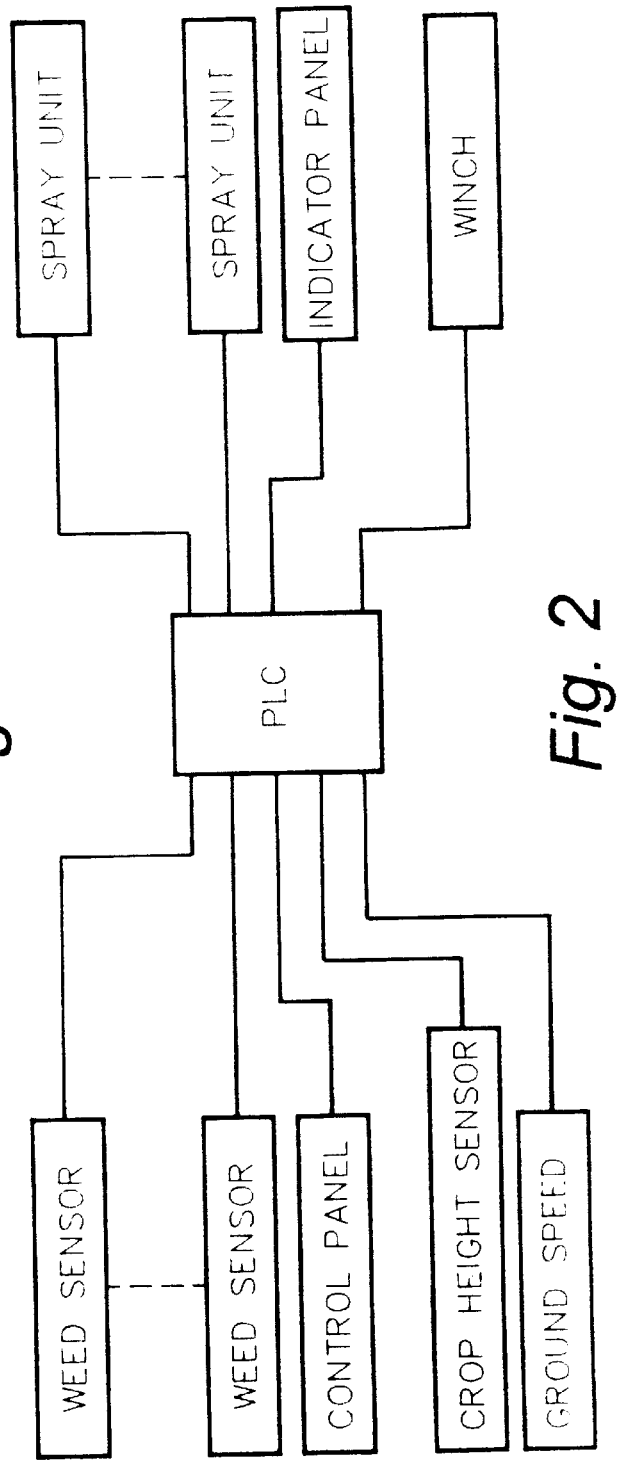
FIG. 2 is a block diagram of the signal flow of the invention.

FIG. 2 is a block diagram showing the signal flow between the various components of the invention. As a weed passes through a particular weed sensor, interrupting the beam received by the photoelectric receiver, a signal is sent to a Programmable Logic Controller (PLC) which, in this embodiment, is secured to the toolbar as seen in FIG. 3. The PLC measures the duration of the interruption and sends a signal to that sensor's spray unit to open the spray valve for an equal duration. Since the spray nozzles are displaced rearwardly from the weed sensors, the spray signal is delayed based on the displacement distance and the speed of the tractor.

Figure 6:
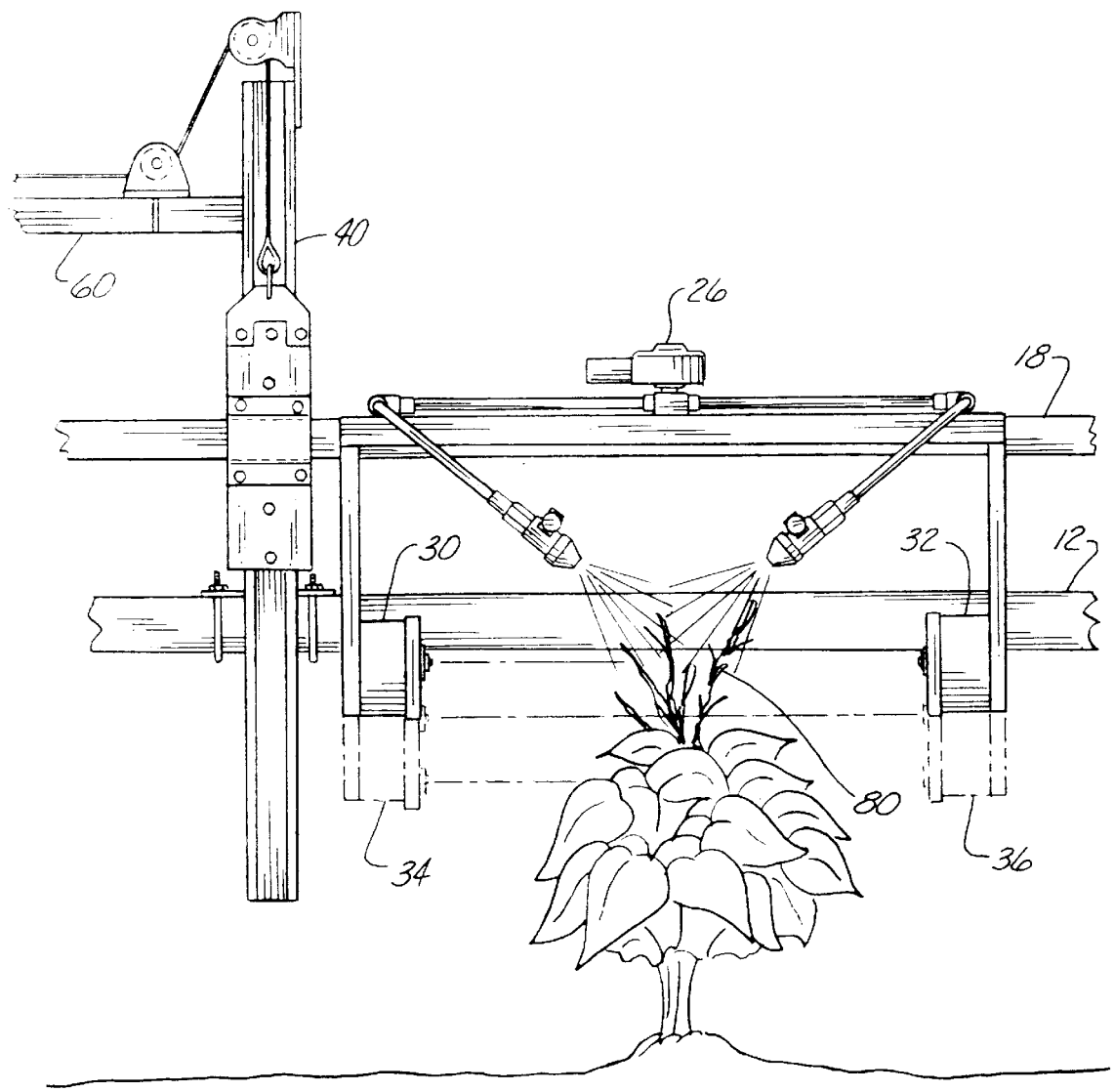
FIG. 6 is a rear view of the invention and depicts the sensing of a weed and subsequent spraying, and also depicts the functioning of the crop height sensor in dashed lines.

This activity is also shown in FIG. 6 where a weed 80 has interrupted the beam between photoelectric transmitter 30 and receiver 32. In response to this interruption, the PLC 70 sends a signal to the open electric valve 26 and the weed 80 is sprayed by nozzles 22.

As seen in FIG. 2, the crop height sensor also operates through the PLC to control the electric winch, which in turn raises and lowers the spray bar. Referring to FIGS. 7,8,and 9, in FIG. 7 both beams of the crop height sensor (dual photoelectric transmitter 34 and receiver 36) are unbroken, indicating that the spray bar 18 is too high. In this case, the failure of the lower beam to be blocked by the crop 72 causes the PLC to send a signal to the winch 62 to lower the spray bar 18 two inches. The PLC will then wait for ten seconds to again react to signals from the crop height sensor. If at that time the lower beam is still unbroken, the PLC will again signal the winch 62 to lower the spray bar 18 two more inches until the situation shown in FIG. 9 is reached, in which the lower beam is continuously interrupted and the upper beam is continually uninterrupted. In FIG. 8, both beams of the crop height sensor are broken, indicating that the spray bar 18 is too low. In this case, continuous interruption of the upper beam causes the PLC to send a signal to the winch 62 to raise the spray bar 18 by two inches. The PLC will then wait for ten seconds to again react to signals from the crop height sensor. If at that time the upper beam is still broken, the PLC will again signal the winch 62 to raise the spray bar 18 two more inches until the FIG. 9 status is reached. Obviously these spray bar movement distances and delay times are only exemplary, and can easily be set to other values as the situation demands.

Figure 10:
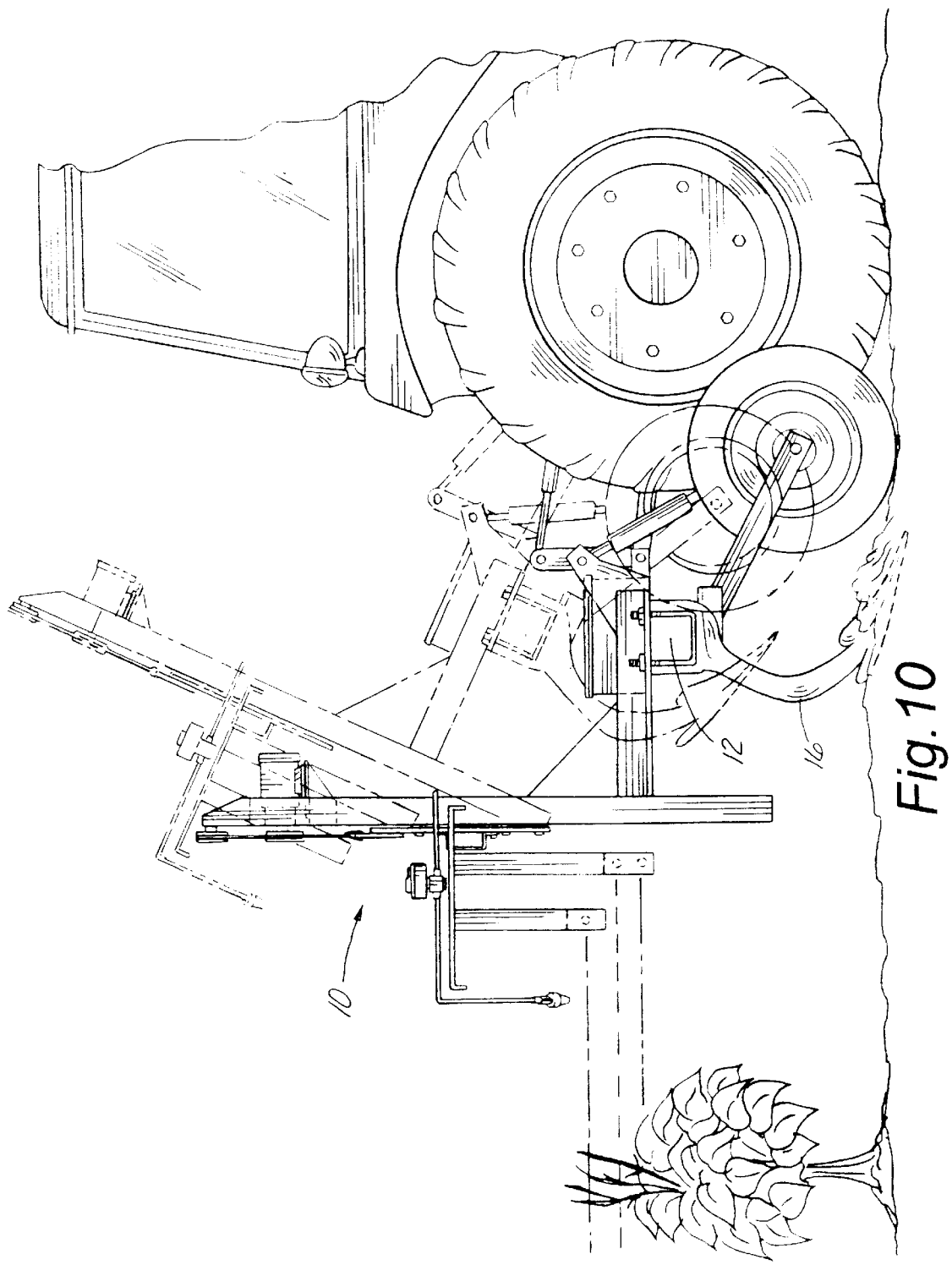
FIG. 10 is a side view of the invention attached to the toolbar of a tractor, with the invention in the operational configuration in solid lines and in the raised, traveling configuration in dashed lines.

FIG. 10 shows, in solid lines, the toolbar 12 in the lowered, working position allowing the cultivators 16 to engage the soil between the rows to dig up weeds 80 while the invention sprays weeds 80 growing within the row of crops 72. The toolbar 12, which is attached to the tractor's three point hitch, is shown in the raised position in dashed lines, raising the invention as well.

Figure 11:
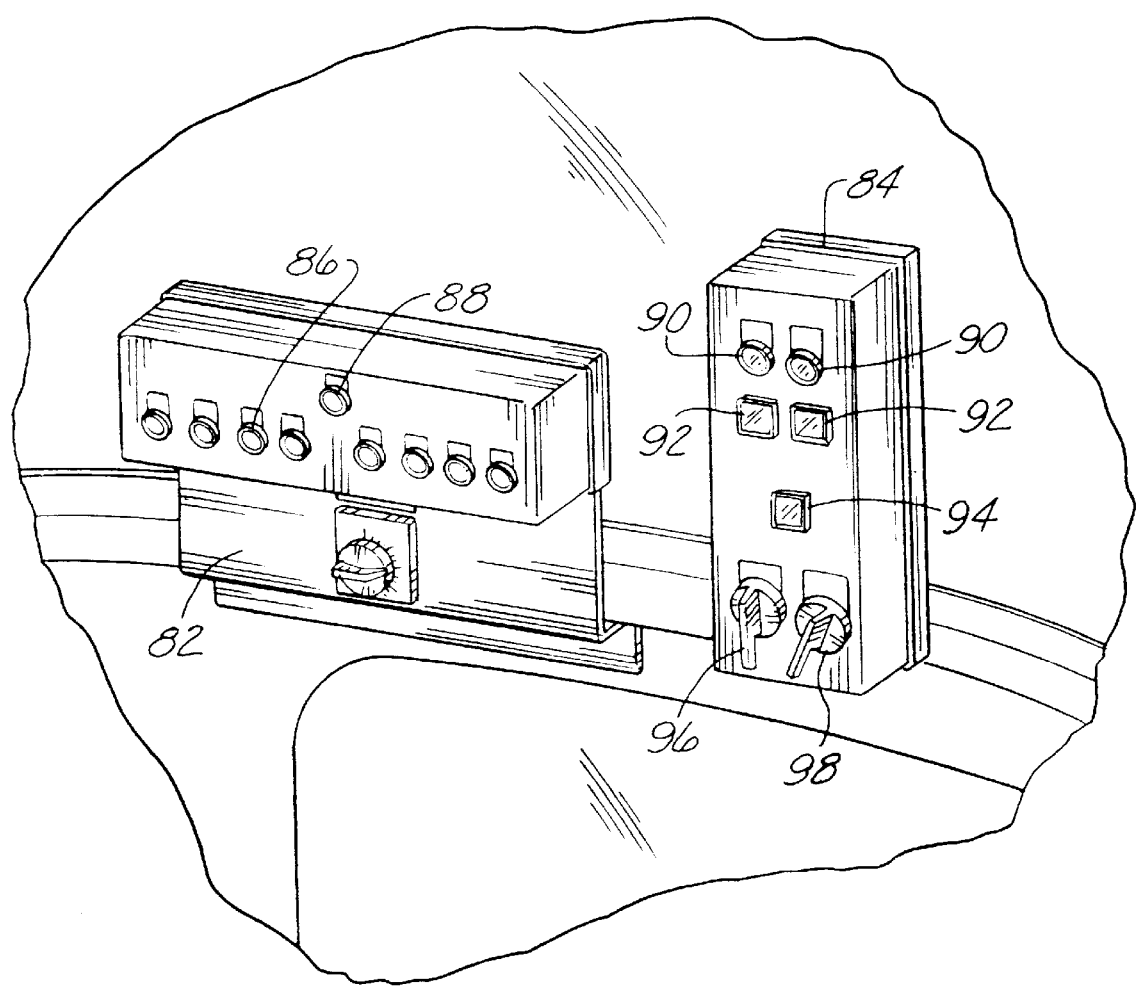
FIG. 11 is a perspective view of the indicator panel and control panel of the invention.

The indicator panel 82 and control panel 84 of the invention are depicted in FIG. 11. The indicator panel 82 utilizes eight lights 86, one for each spray unit 20, to signal when a particular spray unit 20 is in operation. There is also a flow light 88 which signals fluid flow in the main herbicide line leading from the herbicide tank. The control panel 84 utilizes two indicator lights 90 to signal when the spray bar 18 is being raised or lowered by the winch 62. Pushbuttons 92 can be selected to manually lower or raise the spray bar 18, overriding the automatic system. A third pushbutton 94 tests the lamps of all indicator lights. A switch 96 selects the automatic or manual mode for spray bar height control, and a switch 98 controls power to the entire invention.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method for selectively spraying weeds growing in a row of crops, the weeds being taller than the crops, comprising:
    (a) passing a crop height sensor mounted on a moveable frame along said row of crops for monitoring the height thereof, and vertically adjusting the moveable frame in response to the monitored height of said row of crops;
    (b) passing a weed sensor mounted on said moveable frame along said row of crops at a height above said crop sensor for detecting said taller weeds; and
    (c) passing a herbicide spraying apparatus mounted on said moveable frame and operatively associated with said weed sensor along said row of crops; wherein, said herbicide spraying apparatus will be actuated in response to the presence of weeds detected above the height of the row of crops by the weed sensor.

2. The method as recited in claim 1 wherein said weed sensor and said crop height sensor each comprise a photoelectric transmitter and receiver.

3. An apparatus for selectively spraying weeds growing in a row of crops, the weeds being taller than the crops, comprising:
    (a) a frame vertically moveable relative to said crops;
    (b) a crop height sensor means affixed to said vertically moveable frame for monitoring the height of said crop and positioning said moveable frame in response thereto;

(c) weed sensor means affixed to said frame at a height above said crop height sensor means; and (d) a selectively actuatable herbicide dispenser operatively associated with said weed sensor means and affixed to said moveable frame; wherein, the herbicide dispenser is actuated in response to the presence of weeds detected above the height of the row of crops by the weed sensor.

4. The apparatus as recited in claim 3 wherein said weed sensor means includes a photoelectric transmitter and receiver.

5. The apparatus as recited in claim 3 wherein said crop height sensor means includes at least two photoelectric transmitters and receivers.

* * * * *